(12) United States Patent
Weidmann et al.

(10) Patent No.: US 8,758,534 B2
(45) Date of Patent: Jun. 24, 2014

(54) METHOD OF ATTACHING ELEMENTS BY BONDING

(75) Inventors: Björn Weidmann, Borensberg (SE); Anders Westerdahl, Linköping (SE)

(73) Assignee: Saab AB, Linköping (SE)

( * ) Notice: Subject to any disclaimer, the term of this patent is extended or adjusted under 35 U.S.C. 154(b) by 449 days.

(21) Appl. No.: 13/141,030

(22) PCT Filed: Dec. 19, 2008

(86) PCT No.: PCT/SE2008/051528
§ 371 (c)(1),
(2), (4) Date: Sep. 12, 2011

(87) PCT Pub. No.: WO2010/071525
PCT Pub. Date: Jun. 24, 2010

(65) Prior Publication Data
US 2011/0315300 A1     Dec. 29, 2011

(51) Int. Cl.
*B29C 65/52* (2006.01)
(52) U.S. Cl.
USPC .............................. 156/80; 156/293
(58) Field of Classification Search
USPC .................................. 156/80, 293
See application file for complete search history.

(56) References Cited

U.S. PATENT DOCUMENTS

| 2,746,885 | A | 5/1956 | Frederick |
| 5,308,667 | A | 5/1994 | Calhoun et al. |
| 6,190,484 | B1 | 2/2001 | Appa |
| 2004/0014866 | A1 | 1/2004 | Eadara et al. |
| 2006/0059828 | A1 | 3/2006 | Stevenson et al. |
| 2006/0249626 | A1 | 11/2006 | Simpson et al. |

FOREIGN PATENT DOCUMENTS

| EP | 1884533 A2 | 2/2008 |
| GB | 961785 A * | 6/1964 |
| GB | 961785 A | 6/1964 |
| WO | WO-9013420 A1 | 11/1990 |
| WO | WO-2004/076769 A2 | 9/2004 |
| WO | WO-2007/137814 A1 | 12/2007 |

OTHER PUBLICATIONS

PCT/ISA/210—International Search Report—Aug. 27, 2009.
PCT/IPEA/409—International Preliminary Report on Patentability—Mar. 17, 2011.

* cited by examiner

*Primary Examiner* — Michael Orlando
*Assistant Examiner* — Daniel Lee
(74) *Attorney, Agent, or Firm* — Venable LLP; Eric J. Franklin

(57) ABSTRACT

A method of attaching a first portion and a second portion to each other. An adhesive is exposed to a low temperature in order to obtain a non-tacky adhesive. The non-tacky adhesive is arranged between the two portions. The adhesive is cured. Use of adhesive according to the method.

13 Claims, 4 Drawing Sheets

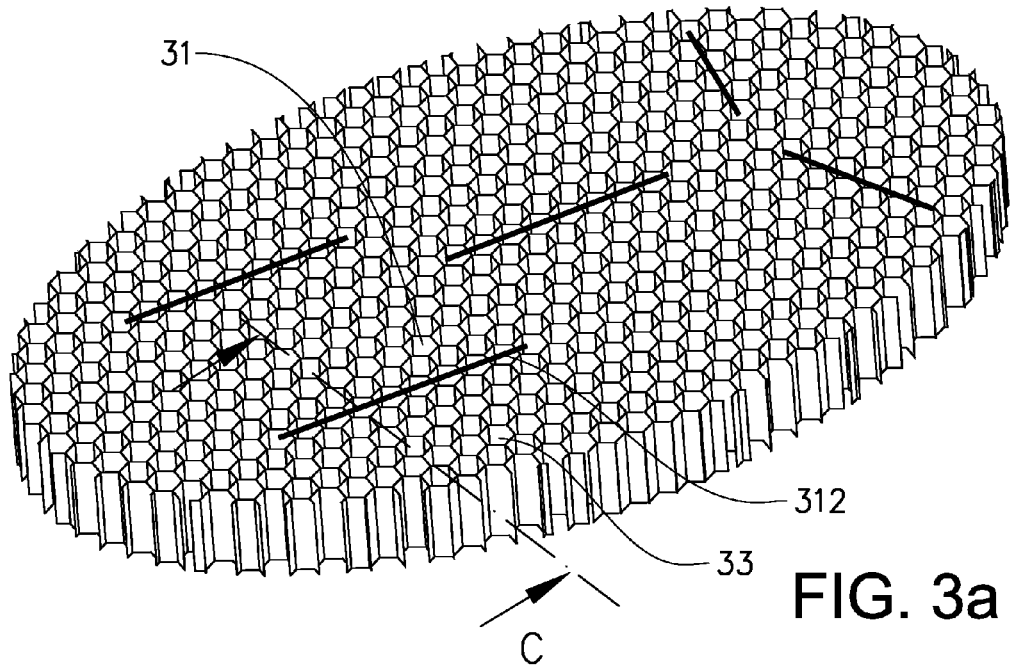
FIG. 3a
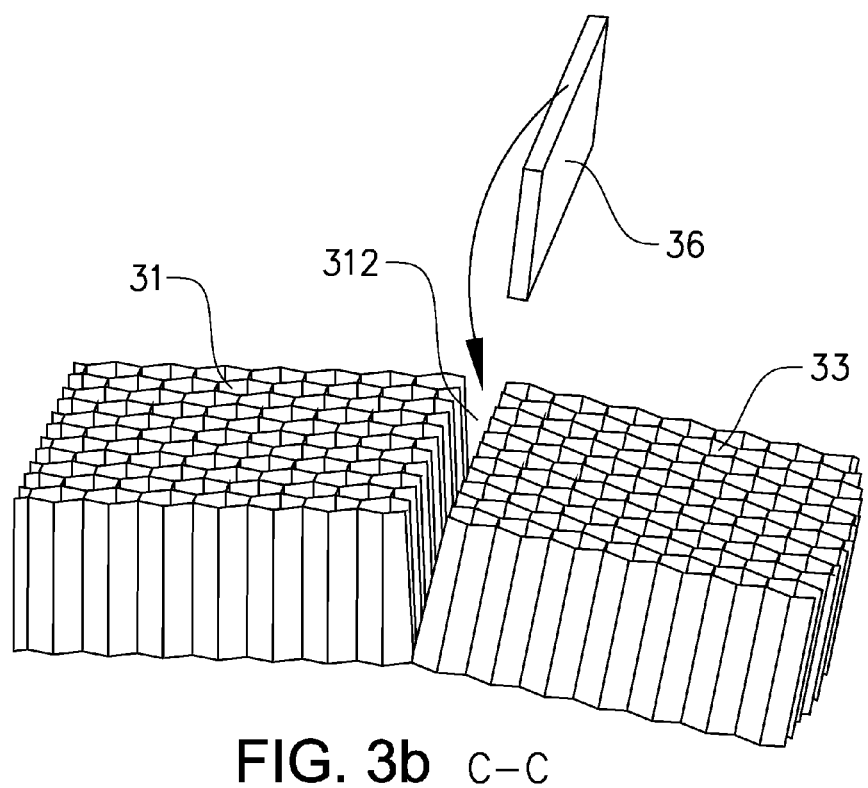
FIG. 3b C-C

METHOD OF ATTACHING ELEMENTS BY BONDING

CROSS-REFERENCE TO RELATED APPLICATION

This application is the national phase under 35 U.S.C. §371 of PCT/SE2008/05128 filed 19 Dec. 2008.

TECHNICAL FIELD

The present invention relates to a method of attaching a first portion and a second portion to each other by bonding, in the area of composite articles, especially in the aircraft industry.

BACKGROUND ART

Attachment of elements in composite articles is sometimes made by bolting. When ribs are attached into a shell of a wing structure or a control structure bolting is for example used. To use bolting is both time consuming and costly.

Further, adhering or bonding of elements in composite articles has been difficult in some instances. When using composite articles in the aircraft industry, the strength of the articles is of high importance. It is therefore important to have adhesive in an even coating, when adhesive is used for attachment in composite articles. If an element is inserted into a cavity in an article, it is difficult to keep the adhesive in an even layer. The element coated with adhesive is inserted and sliding touching the inner surface of the cavity of the article and the adhesive may be wrinkled, scraped, scratched or abraded by the sliding. This impairs the composite article in an unacceptable way.

Further, distance members in the form of for example adhesive films are used for better fitment between an element and a structure. The same problem arises here, when the adhesive film will get scraped, scratched, or abraded when the adhesive coated element is inserted in the structure.

Bonding may be used when composite articles are repaired. If a part of a honeycomb structure has been damaged, the structure needs to be repaired.

A part of the honeycomb structure may be removed and a new part of a honeycomb element is inserted in the cavity from which the damaged part has been deleted. The new part will be coated with adhesive at a part of the surface directed against the cavity of the honeycomb structure, and then inserted into the cavity of the honeycomb structure. When inserting the new part, the adhesive will get scraped, scratched or abraded and the attachment will not be effective. When adhesive films have been used, the adhesive film is attached on the surface of the new part to be inserted into the replacement cavity. The adhesive film will be scraped, scratched or abraded or it will be wrinkled. Sometimes a release film has been used outside the adhesive film, i.e. between the adhesive film and the surface of cavity of the honeycomb structure in order to avoid the scraping, scratching or abrasion of the adhesive film. The release film should then be removed after inserting the new part into the replacement cavity. However, when the release film is removed, the adhesive film may also be wrinkled and this will lead to an impaired attachment between the new part and the structure which is repaired.

Hereby follow some prior art which describes assembling portions and elements in composite articles.

WO 2004/076769 describes the use of adhesive film when a rib is to be assembled. An expanding adhesive film is used and is supposed to fill in any gaps between the ribs and the interior surface of the structural beam.

US 2006/0249626 discloses a way of forming a composite wing. The wing is cured in one single piece.

A method of manufacturing a composite wing without using mechanical fasteners is described in U.S. Pat. No. 6,190,484 B1. A center wing box is formed in combination with spars, rib-lets and a pair of skin-moulds. Then additional cells are adjoined contiguously on either side of the framework and overlap wrapping and bonding process is continued around the current framework.

The present invention solves at least some of the problems disclosed above.

SUMMARY OF THE INVENTION

The present invention relates to a method of attaching a first portion and a second portion to each other, wherein the method comprises
- exposing an adhesive for a low temperature in order to obtain a non-tacky adhesive,
- arranging the non-tacky adhesive between the two portions, and
- curing the adhesive.

Further, the present invention relates to the use of bonding according to the method.

BRIEF DESCRIPTION OF THE DRAWINGS

FIG. 2a) shows a rib in a side view.

FIG. 2b) shows the rib in FIG. 2a) wherein the rib is coated with adhesive.

FIG. 2c) shows the rib during inserting in a wing structure or control structure.

FIG. 3a) shows a honeycomb structure having slits.

FIG. 3b) shows a part of the honeycomb structure in FIG. 3a) in a side view showing one slit and a part of adhesive film to be inserted into the slit.

DEFINITIONS

Figure 1A:
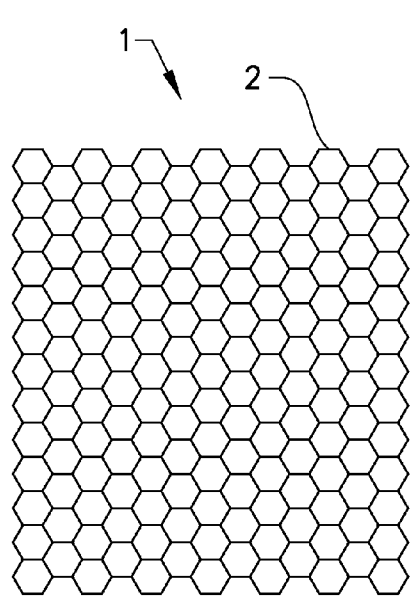
FIG. 1a) shows an element to be bonded into an article or structure according to the present invention.

By "outer surface" of the element is meant the surface which will be directed to the inner surface of the cavity of the article or structure, which the element will be attached and/or adhered into.

By "inner surface" of the cavity is meant the surface of a cavity.

In the claims, we refer to "article or structure". "article or structure" can be considered as a second element, into which a first element is attached into. It could for example be a wing article or structure into which an element is inserted.

DETAILED DESCRIPTION

The present invention relates to a method of attaching a first portion and a second portion to each other, wherein the method comprises exposing an adhesive for a low temperature in order to obtain a non-tacky adhesive, arranging the non-tacky adhesive between the two portions, and curing the adhesive.

If necessary, the portions can also be brought together, and sometimes also pressed to each other. The method could thus comprise bringing the portions together. The curing can be made in several ways, such as in an oven with elevated temperature, uv radiation, infrared radiation, or the adhesive may be cured in room temperature. The time needed for curing will depend on which method which is used, what kind of adhesive which is used, and the temperature used in the oven for example. The skilled person will know what conditions which will be needed for the curing step.

The adhesive can constitute a distance member between the first and second portions, which will be further discussed below. If the adhesive constitutes a distance member, the adherence between the portions need not be as hard as might be needed when relating to attachment, where stronger attachment may be necessary. Liquid shim can be used as an adhesive.

The use of adhesive in composite articles has the advantage that the use of bolts can be avoided. Bolts are used in some instances and are expensive. Further the method of bolting is a time consuming method. Sometimes use of adhesive is necessary, since mechanical attachments are difficult to apply on certain places. It is very important that the articles have a high strength when the articles or structures are used in the aircraft industry. It can then be important that the adhesive has an essentially even thickness between the portions. This could be applied by that the adhesive is applied in an even layer on one of the portions for example. By an even layer is meant that the layer essentially has the same thickness over the whole layer. The adhesive could also be applied in for example a string and then be pressed to an even layer between the portions. Thus, the layer may obtain an even thickness in place between the portions. This is obtained by the method according to the present invention. However, in some instances it is not possible to obtain an even layer of adhesive. This depends on the design of the portions that are intended to be attached to each other.

One of the portions may be coated with the adhesive and then brought together with the second portion. The adhesive coated portion will then be exposed to a low temperature in order to make the adhesive non-tacky. It will then be easier to assemble the adhesive coated portion to the second portion, since the adhesive will not tack to the surface of the second portion which it will touch during the assembling and the adhesive will thus remain its even thickness. Otherwise, the adhesive might get an even thickness when the portions are brought together, and after the adhesive has thawed the adhesive can be pressed between the portions to an even thickness and then be cured. When the article or structure has been constructed, the adhesive shall thaw and then the adhesive is cured. When thawing the adhesive, which is at that moment arranged between the portions, the portions can be bagged and vacuum is applied. This will minimise condensation during thawing.

The present invention is disclosed in for example FIGS. 1a) to 1e). Reference will be made to the Figures in the following.

The method according to the present invention further comprises that the first portion is an element 1 having an outer surface 2, the second portion is an article or a structure 3 having a cavity 4 which has an inner surface 5, whereby at least a part of the outer surface 2 of the element 1 will be directed against at least a part of the inner surface 5 of the cavity 4 of the article or structure 3 when attached in the article or structure 3, wherein the method comprises prior to exposing the adhesive 6 for a low temperature, applying the adhesive 6 to at least a part of the outer surface 2 of the element 1, forming an at least partly adhesive coated element 1, exposing the at least partly adhesive coated element 1 for a low temperature in order to obtain a non-tacky adhesive coated element 1, inserting the non-tacky adhesive coated element 1 into the cavity 4 and curing the adhesive 6.

The adhesive may be pressed onto the element in order to attach well to the element.

Figure 1B:
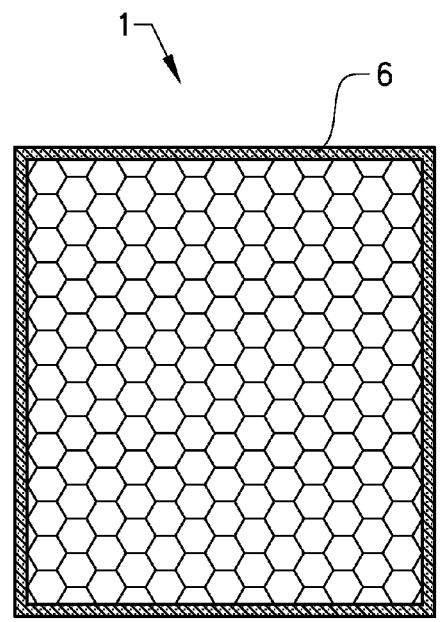
FIG. 1b) shows the element in FIG. 1a) wherein the element is coated with adhesive.
Figure 1C:
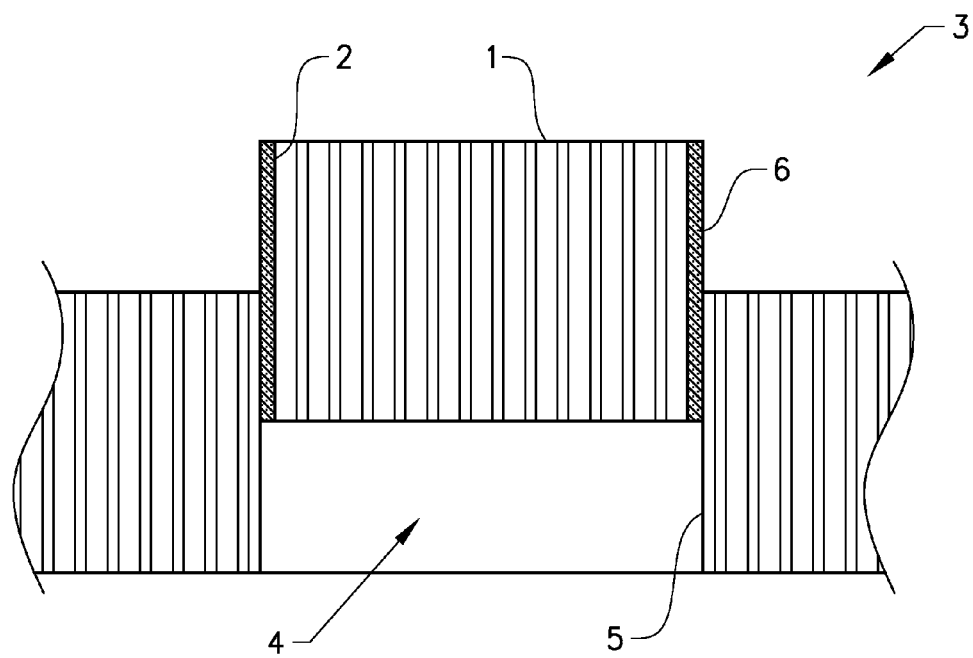
FIG. 1c) shows the adhesive coated element in FIG. 1b), during inserting it in an article or structure.
Figure 1D:
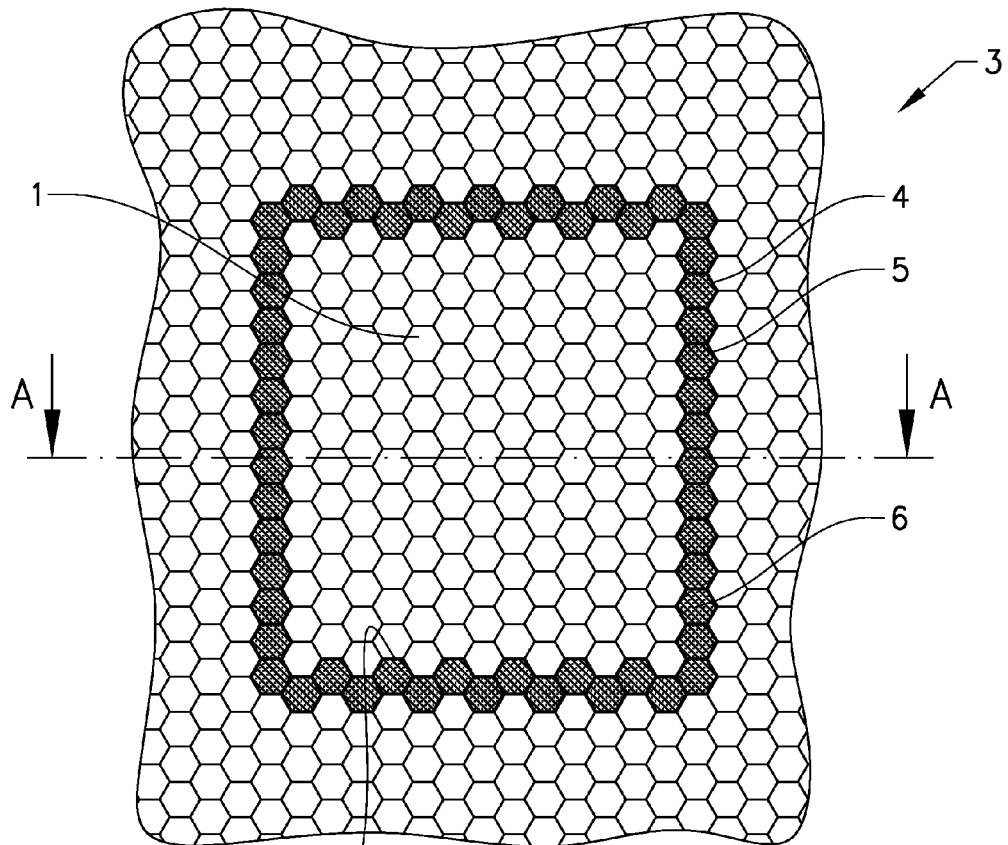
FIG. 1d) shows the article in FIG. 1c) in a view from above, when the adhesive coated element is inserted in the article.
Figure 1E:
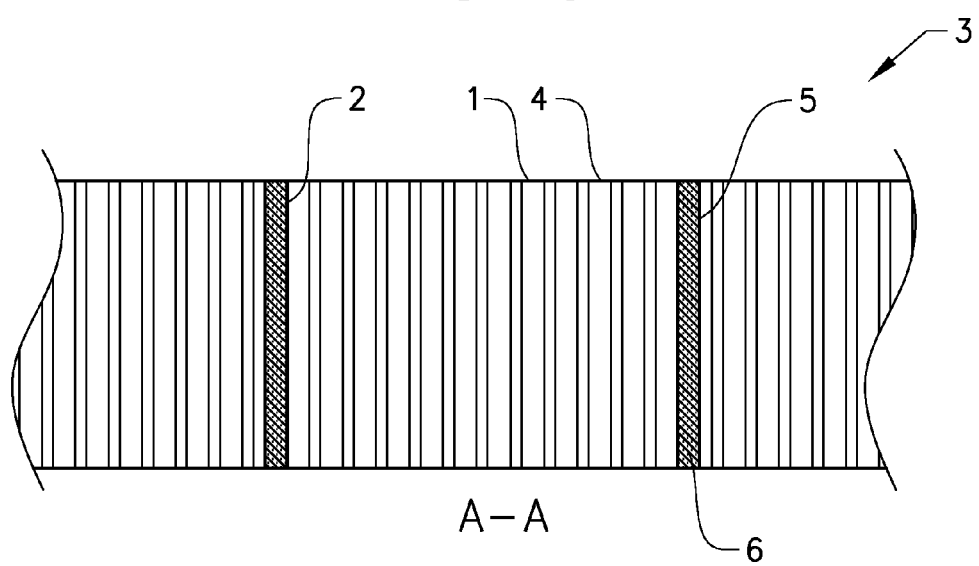
FIG. 1e) shows the article in FIG. 1d) in a side view.

In the FIG. 1d, the cavity 4 is filled by the element 1, and the cavity 4 cannot really be seen, but in FIG. 1e the cross-section of the cavity 4 can be seen with its inner surface 5.

The element 1 is shown in FIG. 1a) before the adhesive is applied to the outer surface 2 of the element 1. It can then be shown in FIG. 1b) that adhesive 6 has been applied to the outer surface 2 of the element 1. In this figure, the adhesive has been applied in the form of an adhesive film. Therefore, the adhesive will not fill the cells, which would have been the case, if the adhesive would have been applied by for example spraying.

When the adhesive is exposed for a low temperature, the adhesive will be non-tacky and sometimes hard or rigid. This is a very good feature, when inserting the adhesive coated element 1 into the cavity. This will result in that the adhesive 6 will not tack to the surface 5 of the cavity 4 and the adhesive 6 will remain in an even layer on the element 1. The adhesive coated element 1 will then slide easily when it is inserted into the cavity 4. Due to the easier sliding of the adhesive, the adhesive will remain intact. The adhesive may also be hard or rigid which will also improve the strength of the adhesive when the adhesive is sliding during the inserting of the adhesive coated element 1.

The present method comprises that the non-tacky adhesive coated element 1 will be inserted by sliding in contact with the inner surface 5 of the cavity 4 while the adhesive 6 is in a non-tacky state. When inserting the adhesive coated element 1, the space between the element 1 and the surface 5 of the cavity 4 will be quite small and sometimes very small. This means that the sliding will occur with contact between the adhesive coated element 1 and the inner surface 5 of the cavity 4 as disclosed above. It is then important that the adhesive will be sliding easily and that the adhesive will remain intact. The intact adhesive is important in order to keep the strength of the article or structure 3 into which the element 1 is inserted. It can be seen in FIG. 1c) how the adhesive coated element 1 is slid in contact with the inner surface 5 of the cavity 4. Since the adhesive is non-tacky, the adhesive may remain to have an even thickness, without tacking to the inner surface 5 of the cavity 4. The adhesive can also obtain an even thickness between the element 1 and the surface 5 of the cavity 4. As disclosed above, it is not always possible to remain an even thickness.

FIG. 1d) shows the article or structure 3 in a view from above. The element 1 can be seen inserted into the cavity 4 (the cavity cannot be seen). The adhesive 6 is shown between the element 1 and the article or structure 3. The adhesive 6 is now filling the cells between the element 1 and the article or structure 3. This depends on that the adhesive has been thawed and then cured, and during this time, the adhesive has flown out and thereby fills the cells. The article or structure is shown in FIG. 1e) in a cross-section from the article or structure in FIG. 1d). The cavity 4 as seen in FIG. 1e) cannot really be seen in this Figure either, since it is filled with the adhesive coated element 1. But it can be seen where the cavity is intended to be. The adhesive coated element 1 is arranged in the cavity 4 of the article or structure 3.

The element 1 is supposed to fit tightly to the inner surface 5 of the cavity 4 in order to get an attachment and adherence between the element 1 and the surface 5 of the cavity 4 of the article or structure 3. The adhesive 6 has been applied to the element 1 and will be adhered thereto. Then, the temperature of the adhesive has been lowered, and when not sticky the adhesive will not tack to the inner surface 5 of the cavity 4 when inserted into the cavity 4.

The adhesive can be applied by spraying, rolling, coating or applying the adhesive in the form of an adhesive film or a piece of adhesive on the part of the outer surface 2 of the element 1. The adhesive may also be in the form of a paste, and would in such a case be coated on the element. After applying the adhesive, the adhesive coated element 1 will be exposed for a low temperature in order to make the adhesive non-tacky.

Any conventional adhesive may be used in the method. The choice depends on what material the element and the article or structure is made of, which are to be attached to each other. Epoxy adhesive and phenol adhesive can be mentioned as examples. The adhesive may also be a liquid shim as disclosed above.

According to the present invention, the adhesive may be applied to the element in a sticky state, in order to attach to the element in a proper way. The adhesive may be applied as an adhesive film on the element. The adhesive is pressed against the element in a sticky state. It is especially important to press an adhesive film on the element. Sometimes vacuum forces are used in order to get a strong adherence of the adhesive to the element and the adhesive coated element 1 is in such cases enclosed in a vacuum bag. An adhesive coated surface is obtained on the element and an at least partly adhesive coated element 1 is obtained. Then the adhesive coated element 1 is exposed for a low temperature in order to make the adhesive non-tacky and sometimes also rigid or hard. It is then possible to insert the element 1 into the article 3 and keep the adhesive 6 in an essentially even layer, without wrinkling, scraping, scratching or abrading the adhesive layer. When the element 1 is inserted into the cavity 4 of the article or structure 3, the adhesive coated surface of the element 1 will be in contact with the inner surface 5 of the cavity 4 of the article or structure 3. The even coating of adhesive 6 will thaw and will then be cured and thereby the adhesive will attach and adhere to the element 1 into the cavity 4 of the article or structure 3 wherein the adhesive 6 contact is even and gives a good adhesive force.

The adhesive coated element can be enclosed in a bag when exposed for low temperature, for example a plastic bag. The enclosing may avoid condense on the adhesive. The enclosed adhesive coated element is then exposed for a low temperature by placing the enclosed adhesive coated element in a refrigerator or freezer for the time needed to make the adhesive non-tacky during the time needed for inserting the element into the article. The time in the refrigerator or freezer depend on the temperature in the refrigerator or freezer. It will also depend on the amount of adhesive, for example the thickness of an adhesive film. A thicker adhesive film will need a longer time for the exposure of lowering the temperature.

The temperature to be reached for the adhesive depends on what adhesive which is used. Different adhesives will get non-tacky at different temperatures. The skilled person will know how much the temperature for different adhesives need to be lowered. Otherwise, the temperature needed for making the adhesive non-tacky could easily be tested.

The temperature that the adhesive or adhesive coated element will be exposed to differs depending on what adhesive which is used, as disclosed above. However, a convenient temperature used for adhesive films may be below $-18°$ C., since that is a conventional temperature in which adhesive is stored. Further, $-18°$ C. is a conventional temperature in a freezer. However, a refrigerator may also be used for the temperature lowering, which has temperatures above $0°$ C. It is thus possible to use any temperature which makes the adhesive sufficient non-tacky and rigid or hard if necessary.

The method may comprise exposing the adhesive coated element for a temperature below $-18°$ C.

Before curing, the adhesive will thaw, which will of course happen, when the temperature increases from the lower temperature that the adhesive has been exposed to. It is preferable that the article or structure together with the inserted adhesive coated element is bagged and vacuum applied in order to minimise condensation.

According to the present invention, the element can be a honeycomb element. Further, the article or structure can be a honeycomb structure. Honeycomb structures are used in the aircraft industry. Such structures may break and then need to be replaced. The honeycomb structure may also be repaired. However, it has been difficult to repair honeycomb structures as described above. The adhesive will be scraped and wrinkled when coated on the element to be inserted into the cavity. This has been solved by the present invention.

When a honeycomb structure or article 3 (we now refer to FIGS. 1*a*) to 1*e*)) is damaged, the damaged part can be removed in order to be replaced. The removed part forms a cavity 4 as disclosed in FIGS. 1*c*, 1*d*) and 1*e*). An element 1 in the form of a honeycomb element will be coated with adhesive 6 as disclosed above. The adhesive may be an adhesive film which is applied on the outer surface 2 of the element 1. Further, the adhesive may be applied by spraying, rolling, coating or applying the adhesive as a piece of adhesive. Then the adhesive coated element 1 is exposed to a low temperature in order to obtain a non-tacky adhesive coated element 1, which is then inserted into the cavity 4 of the article or structure 3. The adhesive coated element 1 is slid in contact with the surface 5 of the cavity 4 of the article or structure 3, which in this case is a honeycomb structure. When honeycomb structures are used, the adhesive may fill out a space between the element and the structure which is not very smooth in the surfaces. This is due to the cells of the honeycomb structure. Thus, an adhesive coating cannot really be considered to have even surfaces. When the adhesive has thawed, the adhesive will fill out the cells as disclosed. The adhesive layer will then vary depending on the form of the cells. It is however, preferred to have an essentially even layer of adhesive.

A honeycomb structure may have different densities in the structure. In such cases, the honeycomb structure is made by carefully cutting different parts of honeycomb structures having different densities, which shapes are adapted to each other for fitting together. The different parts are then arranged together for constituting the honeycomb structure having varying density. With the new method according to the present invention, such arranging of different parts can be easier. The parts do not have to be bonded together from the beginning. Portions can be arranged in a suggested order and then bonded according to the present method. Some portions may be exchanged and inserted according to the present invention if a portion needs to be exchanged for some reason.

The method according to the present invention comprises applying the adhesive to an element which is a structural element 21, see FIGS. 2*a*) to 2*d*), and inserting the structural element 21 into a hollow shell structure 23 wherein the element will be sliding in contact with the inner surface 25 of the cavity 24 of the hollow shell structure 23. This is disclosed in FIGS. 2*a*) to 2*d*), which will be further disclosed below. The hollow shell structure may be made of prepegs for example.

The method will now be described further, when the structural element is a rib 21 and the cavity or shell is a wing structure or a control structure 23, which is disclosed in FIG. 2*d*). In FIG. 2*a*) is a cross-section view of a rib disclosed. In FIG. 2*b* adhesive 26 has been applied on the outer surface of the rib 21. The rib has the form of a beam which has two flanges 29. Each flange 29 has two surfaces opposite to each other. One surface 27 is directed to the other flange 29, and the other surface 22 is directed outwards in the opposite direction. The outward direction is considered to be the outer surface 22 of the rib 21. When adhesive 26 has been applied to the rib 21, the adhesive coated rib 21 will be exposed for a low temperature in order to make the adhesive non-tacky. Then the adhesive coated rib 21 will be inserted into the wing structure or control structure, which can be seen in FIG. 2*c*). It may be important to have an even thickness of the adhesive between the rib 21 and the wing structure or a control structure 23 as disclosed above. This can be obtained in the same manner as disclosed above. However, other designs might be necessary sometimes, and it might not be possible to apply or obtain and even layer of adhesive.

The adhesive can be applied in any method as disclosed above. Further, the method comprises applying the adhesive 26, to a structural element which is a rib 21, there after inserting the rib 21 by sliding the adhesive coated rib 21 in contact with the inner surface 25 of the cavity 24 of a wing structure or a control structure 23. When arranging ribs 21 in for example a control structure 23, the fitting is very important. The ribs 21 are then made to fit very well into the control structure 23. The ribs 21 are constructed so that they sometimes need to be pre-pressed in order to give the strength and fitting into the control structure. Even if the invention is described in connection to a rib inserted in a wing structure or control structure, this is only an example of an element inserted in an article or structure. The adhesive may be applied by spraying, rolling, coating or applied as an adhesive film or a piece of adhesive. The adhesive may also be a liquid shim, which is a form of adhesive.

When inserting the rib 21, the rib could be inserted in a pre-pressed stadium into the wing structure or the control structure 23. The pre-pressing will be made by pushing the outer ends of the flanges downwards to each other. When inserting the rib 21, the non-tacky adhesive 26 will be sliding in contact with the inner surface 25 of the cavity 24 of the wing or control structure 23, but the adhesive 26 will keep the even coating and will give a very good adherence of the rib 21 to the control structure 23. When the rib 21 is on place, the pressure towards the inner surface 25 of the cavity 24 of the control structure 23, will give a strong attachment of the rib 21 in the control structure 23. As disclosed above, the adhesive must not be in an even layer when inserting the rib. However, it may be advantageous. It may also be pressed to an even thickness.

The adhesive 26 is applied on the outer surface 22 of the rib. The adhesive is sometimes pressed onto the rib 21 in order to improve the adherence of the adhesive 26 to the rib 21. The adhesive coated rib 21 can be enclosed in the bag and the enclosed adhesive coated element 21 will then be placed into a refrigerator or a freezer for making the adhesive non-tacky.

If the adhesive is applied as an adhesive film it may be advantageous to press the adhesive film against the surface of the rib 21.

The bag will be removed from the adhesive coated element and the adhesive coated element 21 will then be inserted by sliding in contact with the inner surface 25 of the cavity 24 of the wing structure or the control structure 23. The adhesive 26 will lie tight against the rib 21 and might be rigid, hard and is non-tacky and will thus not tack to the inner surface 25 of the cavity 24 and will be hard enough to stand the forces when inserting the element 21. When the second portion is a wing structure or control structure, the cavity of the structure can be considered to be a quite large part of the structure, which can be considered to be made of a shell structure. The structural element will then not be filling the whole cavity. It will be inserted and arranged in the cavity. Before curing, the wing structure or control structure, comprising the adhesive coated rib inserted in the wing structure or control structure, is preferably bagged and vacuum is applied. This has the advantage that condensation is minimised during the time when the adhesive is thawed. The step comprising bagging and applying vacuum is used for all the different examples disclosed, when the adhesive is thawed before the curing according to the present invention.

The adhesive can at the same time as it constitutes an attachment between the two portions also constitute a distance member between the first and second portions as disclosed above. When inserting ribs in a wing structure or control structure, it may be difficult to find a rib in the proper size. If the rib is not fitting precisely, a distance member can be used for fitting the rib into the wing structure. According to the present invention, the adhesive can form such a distance member between two portions as disclosed above. The distance member works as an insert between the first portion and the second portion or between the element and the article or structure. This may be especially advantageous when it relates to structural elements which are inserted into a hollow shell structure for example. The distance member can be made of adhesive or of liquid shim. The same method is used, but the shape of the distance member is made in order to fit the element into the article or structure. The attachment does not need to be as hard when the adhesive or liquid shim is used as a distance member. However, there will be an attachment as well. Thus, according to the present invention, the adhesive can constitute a distance member between the first and second portions or between the element and the article or structure.

The adhesive is applied as disclosed above. When the adhesive is used as a distance member, it is not necessary that the adherence is as high as when the adhesive is only used for attachment. When the adhesive is used as distance members, it may also be necessary to use some further means of attachment, such as bolts, screws or rivets for example. In addition to be used as a distance member, the distance member may also give extra strength to the attachment, since both a mechanical attachment is used together with the adhesive attachment.

Figure 2D:
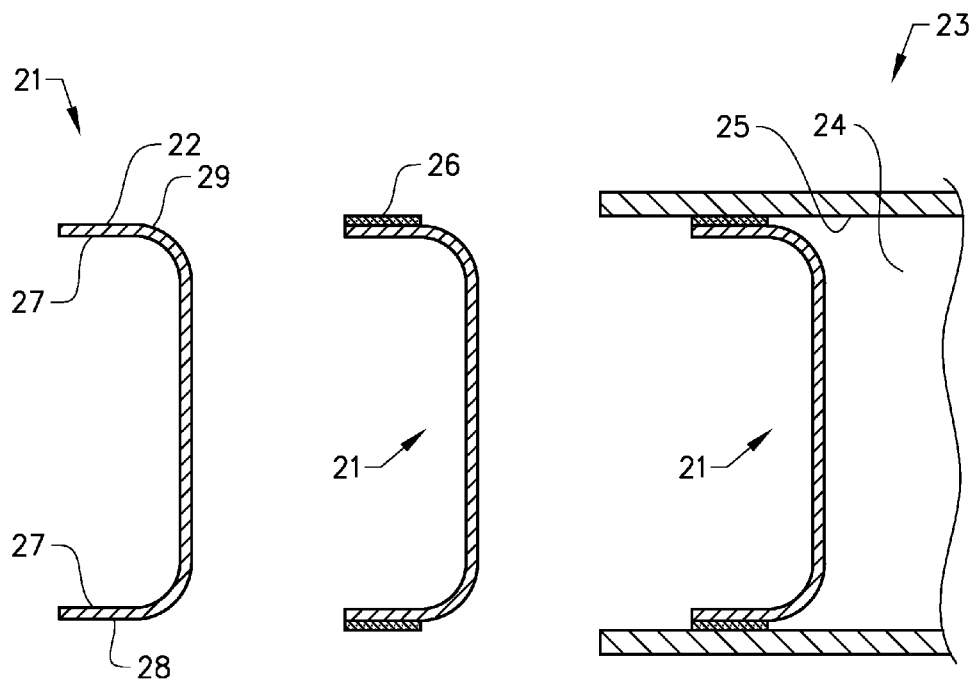
FIG. 2d) shows the rib inserted in the wing structure or control structure.
Figure 2D:
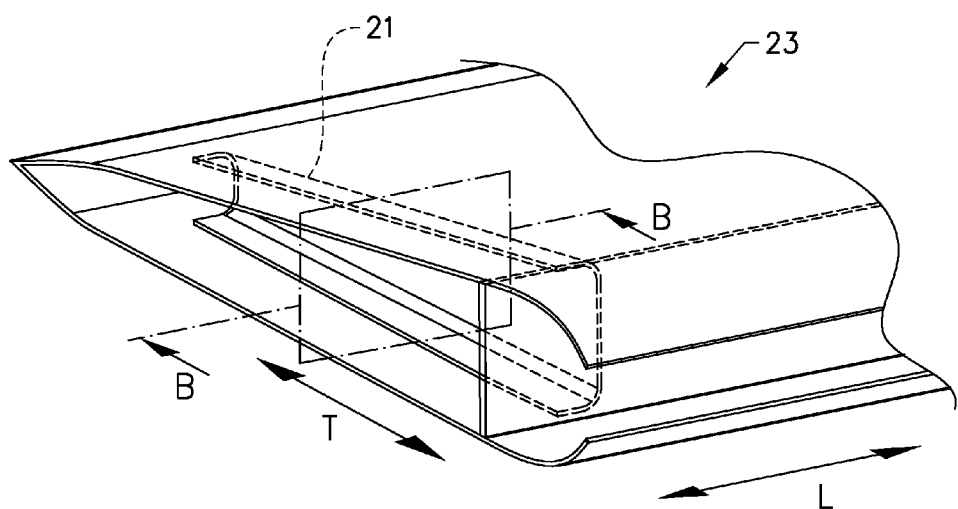

In FIG. 2*d*), the rib 21 can be seen in a wing structure 23. The rib 21 is extending in the transversal direction of the wing structure 23, which also has a longitudinal direction L. Several ribs can be inserted in one wing structure 23. They are usually inserted with some space between them. The wing structure may also have longitudinal spars. In such cases it is not possible to have ribs extending over the whole transversal length of the wing structure. Then shorter ribs can be inserted between the spars.

The present invention also relates to a method wherein the first portion and the second portion are portions of a honeycomb article or structure, shown in FIGS. 3a) and 3b), wherein the two portions 31, 33 are partly held together by the article or structure itself, and has a slit 312 between them, the slit 312 has two surfaces directed against each other, and the method comprises opening the slit 312 and inserting the adhesive 36 by sliding the adhesive 36 in contact with the surfaces of the slit 36 and then curing the honeycomb structure 313. The adhesive has been exposed for a low temperature in order to be made non-tacky, rigid and optionally hard before inserted into the slit. Herein, portions relate to parts of a honeycomb structure which are partly divided with a slit. The slit has two surfaces, wherein each part has one surface directed to the surface of the other part. When stating that the portions are held together by the article or structure itself, it is meant that the portions are held together at the bottom of the bottom part of the article or structure and/or by the structure or article surrounding the slit 12. When portions are held together at the bottom can be seen in FIG. 3b). The slit can also go through the whole thickness direction and the structure or article is held together by the part of the article or structure which is surrounding the slit. This can be seen in FIG. 3a), where the article or structure comprises several slits, and the portions divided by the slits are held together around the slits. When the slit is not going through the whole direction, the article is held together by a bottom part. In such a case, the portions can be held together both by the bottom part and by the surrounding parts of the article or structure.

An article or structure shown in FIG. 3a) comprises several portions divided by slits. Thus, the slits could be considered to each divide two portions which are attached by inserting adhesive and then curing according to the method according to the present invention. Hence, the article may comprise several slits in which adhesive is inserted.

When a slit in a honeycomb structure is filled with adhesive as disclosed above, the honeycomb structure will be bent in some degree, which will depend on how much adhesive which is added into the slit and how the slit is made. Several slits may be made in the structure as disclosed in FIG. 3b). The honeycomb structure can thus get a curved or domed form. The curved form is not shown in FIG. 3a). The honeycomb structure is only shown with the slits without the adhesive added.

When forming a honeycomb structure which should have curved or domed form, the structure is commonly made by forming the structure as a honeycomb structure from the beginning in one piece, i.e. the structure is ordered in a special shape from the manufacturer. The honeycomb structure can also be made in several pieces. Both methods are time consuming and expensive. With the method according to the present invention it is now possible to use a honeycomb structure and then form the structure by slitting the honeycomb structures in suitable places and then inserting adhesive in the slits. With the new method the structure can be made in more cost effective way. With the new method it is now possible to insert the adhesive.

The slit is a small space into which an adhesive is inserted. Into this small space it is very difficult to be able to insert adhesive. The adhesive will get stuck to the surfaces of the slit if it is tacky.

The adhesive is easily inserted in the slit due to that the adhesive has been exposed to a low temperature and is thus non-tacky and it may also be rigid and hard. Since the adhesive is non-tacky and maybe also rigid and hard it is easily inserted and can slide in contact with the surfaces of the slit. This would not have been able to do with a tacky adhesive. The adhesive may be an adhesive film or a piece of adhesive. When the adhesive film or piece of adhesive is non-tacky, rigid and optionally hard, it is easily inserted in the slit. As disclosed above, the honeycomb structure with adhesive inserted in slits, can be bagged and vacuum will be applied during the thawing of the adhesive, in order to minimise condensation.

During the curing, it may also be preferred to bag the portions, elements and article or structures. The curing step may then be performed under vacuum and pressure. This relates to any curing used for curing the different examples of bodies disclosed in the present application.

The present method also relates to the use of adhesive according to the method disclosed above.

By the new method it has been possible to make constructions in an easier way and some of the constructions were not possible before. The constructions are lighter, and thus save weight which is important in the aircraft industry. Controls having ribs attached according to the present method can for example stand higher loads and at the same time save weight.

The invention claimed is:

1. A method of attaching a first portion and a second portion to each other, wherein the first portion is an element having an outer surface, the second portion is an article or a structure having a cavity which has an inner surface, whereby at least a part of the outer surface of the element will be directed against at least a part of the inner surface of the cavity of the article or structure when attached in the article or structure, the method comprising:
    applying adhesive to at least a part of the outer surface of the element, forming an at least partly adhesive coated element,
    exposing the at least partly adhesive coated element to a temperature sufficient to obtain a non-tacky adhesive coated element and so that the adhesive will be hard or rigid,
    inserting the non-tacky adhesive coated element into the cavity by sliding in contact with the inner surface of the cavity, while the adhesive is in a non-tacky and hard or rigid state, and
    curing the adhesive.

2. The method according to claim 1, further comprising:
    applying the adhesive by spraying, rolling, coating or applying the adhesive in the form of an adhesive film or a piece of adhesive on the part of the outer surface of the element.

3. The method according to claim 1, wherein the element is a honeycomb element.

4. The method according to claim 3, wherein the article or structure is a honeycomb structure.

5. The method according to claim 1, further comprising:
    applying the adhesive to an element which is a structural element, and
    inserting the structural element into a hollow shell structure, wherein the adhesive coated element will be sliding in contact with the inner surface of the cavity of the hollow shell structure.

6. The method according to claim 5, further comprising:
    applying the adhesive to a structural element which is a rib, and
    inserting the rib by sliding the adhesive coated rib in contact with the inner surface of the cavity of a wing structure or a control structure.

7. The method according to claim 6, further comprising:
    inserting the rib in a pre-pressed stadium into the cavity of the wing structure or the control structure.

8. The method according to claim 1, wherein the adhesive is applied to the surface of the element in a tacky state.

9. The method according to claim 1, wherein the adhesive comprises a shim between the first and second portions or the element and the article or structure.

10. The method according to claim 1, wherein the adhesive coated element is exposed to a temperature below −18° C.

11. A method of attaching a first portion and a second portion to each other, wherein the first portion and the second portion are portions of a honeycomb article or structure, wherein the two portions are partly held together by the article or structure itself and has a slit between them, the slit has two surfaces directed against each other, the method comprising:
   exposing an adhesive in the form of an adhesive film or a piece of adhesive to a temperature sufficient to obtain a non-tacky and hard or rigid adhesive,
   opening the slit and inserting the adhesive by sliding the adhesive in contact with the surfaces of the slit while the adhesive is in a non-tacky and hard or rigid state,
   curing the adhesive, and
   curing the honeycomb structure.

12. The method according to claim 1, wherein the second portion comprises prepregs.

13. The method according to claim 1, wherein the first portion and the second portion are bagged during curing, and wherein the curing is performed under vacuum and pressure.

\* \* \* \* \*